F. LEHMANN.
BAKING APPARATUS.
APPLICATION FILED AUG. 1, 1921.

1,436,989.

Patented Nov. 28, 1922.

Witnesses:
E. Alder
M. Fraiss

Inventor:
Franz Lehmann
by C. Jewes
his attorney.

Patented Nov. 28, 1922.

1,436,989

UNITED STATES PATENT OFFICE.

FRANZ LEHMANN, OF TRIMBACH, SWITZERLAND.

BAKING APPARATUS.

Application filed August 1, 1921. Serial No. 489,020.

*To all whom it may concern:*

Be it known that I, FRANZ LEHMANN, a citizen of the Republic of Switzerland, and resident of Trimbach, in the Canton of Solothurn, Switzerland, have invented certain new and useful Improvements in Baking Apparatus (for which I have filed applications in Switzerland April 12, 1921, and in Germany on March 18, 1921), of which the following is a specification.

This invention has reference to baking and cooking apparatus of the kind which, when in use, is placed upon a heating device such as a gas-kitchener or electric heater. The characteristic features of my baking apparatus consist—firstly, in that in two constructions hereinafter described and adapted for gas-kitcheners provision is made of a metal pot of substantially cylindrical form having a lid, both the pot and the lid having apertures in their walls in such a way that by adjusting the lid the said apertures may be adjusted in relation to their size; secondly, in that the bottom of the pot has attached thereto or is formed with an inwardly projecting annular flange in the shape of a truncated cone which is closed at the top and provided with openings in its sides to allow the gases of combustion or the hot air to penetrate into the pot and to evenly distribute themselves around and above a cooking dish or mould; and thirdly, in that between the cooking dish and the said annular flange a heat-neutralizing contrivance is interposed. This contrivance comprises a hollow metallic body filled with insulating material and is formed at its top with annular ribs, all in such a manner, that the amount of contact between the top of the contrivance and the cooking dish is reduced to a minimum.

In another construction of the cooking or baking apparatus adapted more particularly for use with electric heaters the bottom of the pot is of course closed and of flat shape and made to receive an annular flange which, as in the previously described constructions, is provided with apertures in its sides, the said flange forming part of or being made integral with the hollow heat-neutralizing contrivance, upon the ribbed top of which may be mounted, one above the other, two cooking dishes having air-holes near their top edges.

In order that this invention may be more clearly understood, reference is made to the accompanying drawings illustrating a number of forms in which my said invention may be embodied: In these drawings.

Similar parts are designated by like references throughout the views and the specification.

Figure 1:
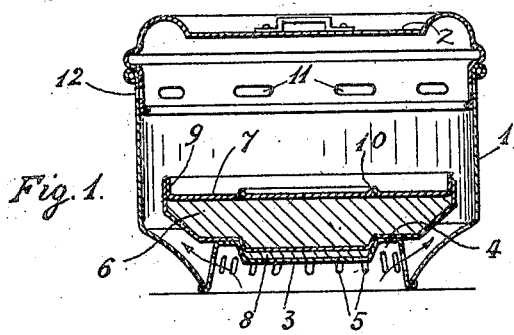
Fig. 1 shows a sectional elevation of the baking apparatus according to a first construction.

Referring to the construction shown in Fig. 1, I provide a metal pot 1 of substantially cylindrical form adapted to be shut by a lid or cover 2. The lower portion of the wall of the pot is curved inwardly in the manner illustrated and made integral with or connected to the pot bottom. The latter, projecting inwardly of the pot, has the shape of a truncated cone or annular flange 4 recessed at 3, and is provided at its circumference with a series of apertures 5 through which the combusted gases or the hot air penetrates into the interior of the pot when the same is placed upon a gas-kitchener or an open fire. Upon the truncated cone 4 a heat neutralizing contrivance is fitted, consisting of a metallic hollow body 7 filled with insulating material 6. This hollow body 7 is so constructed and mounted on the truncated cone 4 that immediately above the recess 3 a chamber is formed which contains a layer 8 also of insulating material, only a very limited portion of the metal parts of the body 7 thus coming into contact with the metal bottom of the pot and thereby neutralizing the heat transmitted from said bottom to the hollow body 7. The latter has integral and annular ribs fashioned thereon, as at 9 and 10, the said ribs serving to reduce to a minimum the amount of contact between the baking plate (not shown) and the top of the hollow body 7 on which the baking plate is made to rest. The annular rib 9 serves at the same time as a guide and centering device for the baking plate.

The hot air or combusted gases rising from the heating source are caused to penetrate through the apertures 5 into the pot 1 and to mount, evenly distributed by said apertures, into the space formed by the walls of the pot 1 and the hollow body 7. Thence the hot air or the combusted gases flow to the upper part of the pot and around and over the top of the baking plate or mould thereby heating the same to a degree adapted to be controlled by outlet openings 12 arranged in the upper portion of the pot 1 and corresponding openings 11 in the adjustable lid 2. By adjusting the lid 2 and consequently the size of the aforesaid outlets the user is enabled to regulate at will the degree of heating above the baking plate, while an overheating of such baking plate is prevented by the hollow body containing the insulating material 6.

Figure 2:
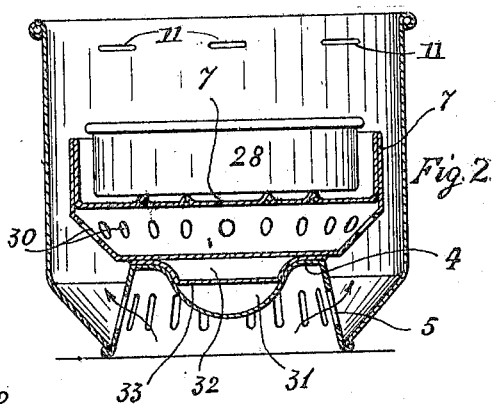
Fig. 2 shows a similar view of a modified construction, the cover or lid, however, being omitted. Both these constructions are adapted for use with gas-kitcheners.

In the modified construction, Fig. 2, in which, though not shown, use is also made of a cover or lid 2 with openings corresponding with those at 11, the heat neutralizing body 7 resting on the bottom 4 of the pot 1 consists of an air-filled hollow part, the air entering through apertures 30 therein. In this case the bottom of the pot 1, as in the previously described constructions, is substantially in the form of a truncated cone which, however, has a central and downwardly reaching curvature. The latter serves for the reception of the lower chambered portion 33 of the body 7, in such a manner, that air-tight chambers 31 and 32 are formed for the purpose of limiting the direct contact of the metal bottom of the pot 1 and that of the hollow body 7.

Figure 3:
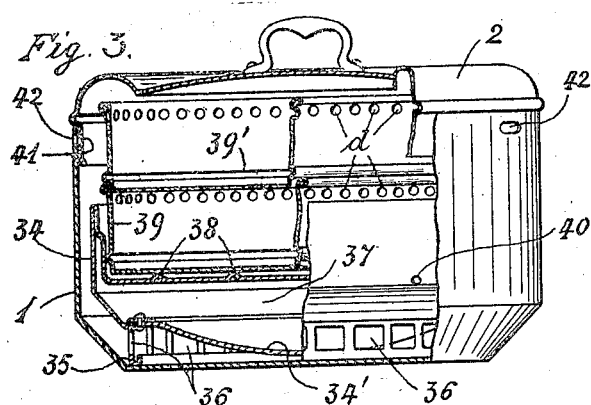
Fig. 3 is an elevation, partly in section, of a baking apparatus adapted to be heated by electrical means.

According to a further modified construction, Fig. 3, which is particularly adapted in connection with electrical heating means, the pot 1 with cover 2 is preferably made of aluminum. Provision is hereby made of a heat neutralizing contrivance comprising a substantially cylindrical body 34 which is hollow and fitted with an integral flange 35 at its bottom which flange rests on the bottom of the pot 1 and is provided with apertures 36, said flange moreover being made high enough to prevent the base 34' of the hollow body 34 from touching the bottom of the pot 1. The hollow or chamber 37 of such body is filled with air and its top is formed with annular ribs 38 upon which the baking plate 39 is made to rest, the hot air rising from the pot-bottom through the apertures 36, around the wall of the hollow body 34 and over the baking plate or plates. If, as shown, two baking plates 39 and 39' are employed, one placed above the other, their relative position may be changed during the baking process. The hollow body 34 is furthermore provided at its circumference with three holes, as at 40, which permit of the hot air in the chamber 37 to escape into the pot 1, while holes 41 arranged in and near the top edge of the cover 2 are adapted to be brought opposite corresponding holes 42 in the top part of the pot in order to allow ventilation of the latter during the baking process.

The hollow chamber 37 instead of containing air could also be filled with another insulating medium such as silicious sinter.

It will be easily understood that the hollow part of the contrivance or body 7, Figs. 1 and 2, and also that by 37 in Fig. 3 could also be filled with water instead of air, in which case it would merely be necessary to fit these bodies with a laterally disposed pipe serving for the supply of water and for the escape of the steam produced. And it will also be understood that the construction and arrangement of the various parts of the baking apparatus may be made subject to many more modifications without altering the character of my invention.

What I claim is:—

1. In the herein-described baking apparatus, the combination, with a pot of substantially cylindrical form and a cover fitting over the pot, of an annular flange secured to the pot-bottom and being closed at the top and provided with a series of apertures in its circumference, the said flange moreover having a recess at the top and projecting inwardly of the pot-bottom, and a heat-neutralizing contrivance mounted on the annular flange and consisting of a hollow substantially cylindrical body adapted to receive insulating material.

2. In the herein-described baking apparatus, the combination, with a pot of substantially cylindrical form having apertures in and near its top edges, and a cover fitting over the pot and provided with apertures corresponding with those in said pot, of an annular flange secured to the pot-bottom, the said flange being recessed at the top and provided with a series of openings in its circumference and projecting inwardly of the pot-bottom, and a hollow substantially cylindrical body mounted on the annular flange and having annular ribs formed on its top, all as and for the purpose set forth.

In testimony whereof I have hereunto set my hand in the presence of two subscribing witnesses.

FRANZ LEHMANN.

Witnesses:
  WILLAM E. HOLLAND,
  W. KAPPELER.